Feb. 16, 1926.                                                    1,573,551
                        D. C. KLAUSMEYER
                        PEEP HOLE FOR THREADS
                         Filed July 8, 1921
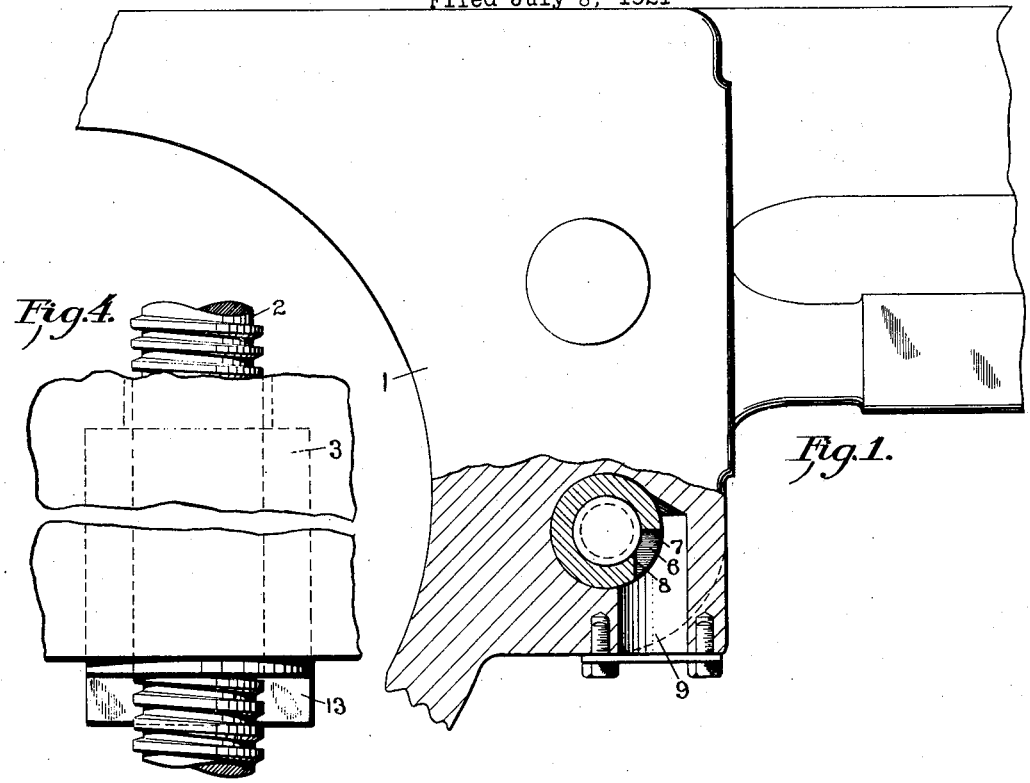
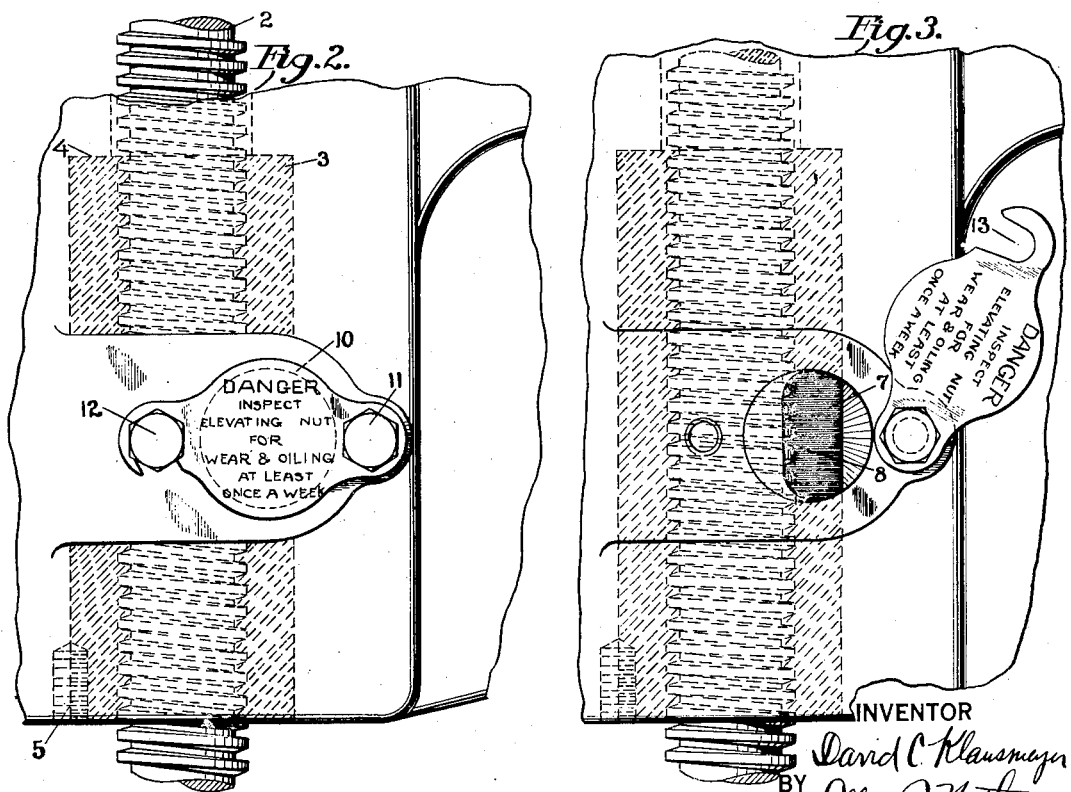
INVENTOR
David C. Klausmeyer
BY Albert F. Nathan
                ATTORNEY Patented Feb. 16, 1926.

1,573,551

UNITED STATES PATENT OFFICE.

DAVID C. KLAUSMEYER, OF CINCINNATI, OHIO, ASSIGNOR TO THE CINCINNATI BICKFORD TOOL COMPANY, OF CINCINNATI, OHIO, A CORPORATION OF OHIO.

PEEPHOLE FOR THREADS.

Application filed July 8, 1921. Serial No. 483,230.

*To all whom it may concern:*

Be it known that I, DAVID C. KLAUSMEYER, a citizen of the United States, and residing at Cincinnati, in the county of Hamilton and State of Ohio, have invented a new and Improved Peephole for Threads, of which the following specification is a full disclosure.

This invention contemplates certain improvements in the arrangement and formation of the chief elements of mechanism for moving a given member against retroactive opposition, such as gravity, whereby the liability of accidents, due to undue wear on the threads of the nut, will be easily avoidable.

The need for some safety expedient in connection with elevating apparatus of the screw and nut type has become more and more pronounced with the increased massiveness of modern machinery since ponderous weights are now commonly sustained by the threads which, by reason of constant usage, are subject to wear; the wear often taking place much more rapidly than expected, especially when the lubrication has received insufficient attention. The screw being visible is very likely to mislead the user into believing that the parts may be safely depended upon, because its wear is distributed over an extensive length of thread and is therefore comparatively slight with respect to a unit length of thread. The threads of the nut, however, are not visible and, being quite short, are more intensively affected by the wear, and may, accordingly become worn away until of insufficient thickness to sustain the load. This is notably true in the case of certain types of machine-tools; a radial-drill, for example, having a heavy arm in which the nut is usually so embedded as to render it inaccessible to the user without demounting the lifting screw, which is at best a very troublesome task and hence likely to be neglected until the nut fails and the parts fall and cause damage to the machine or injury to the attendant.

To cure this defect, this invention proposes a construction enabling the user at all times and without entailing any inconvenience immediately to inspect the condition of the threads of the nut so that he may constantly be kept aware of the extent of the wear and given an ample opportunity to procure a new nut and replace the old one before it has become worn to the point of danger.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Fig. 1 is a plan of a fragment of the arm of a radial drill; the nut and screw being shown in horizontal section. Fig. 2 is a front elevation of the device shown by Fig. 1 with the peephole closed to keep out dirt. Fig. 3 is a view similar to Fig. 1; the covering being open to exhibit a section of the thread of the nut. Fig. 4 is a modification showing a somewhat simpler embodiment of this conception.

Referring to the drawings, 1 designates a portion of the arm of a radial-drill which, in a conventional manner, is elevated by a lifting-screw 2 threaded through a nut 3, mounted in a suitable recess 4 in the arm, and suitably retained therein; as by means of a set-screw 5. Unlike the conventional nut, this nut has a sector 6 removed from a portion of its wall so as to provide a relatively small radial flat 7 in the nature of a section taken transverse to the threads of the nut. The other wall 8 of the opening 6 is so disposed or located that it will not obstruct the visibility of the sample section of the threads. The sectoral opening 6 may, advantageously, be located intermediate the ends of the nut, as shown by Figs. 1, 2, 3, and in that event this invention contemplates a cooperating peep-hole 9 extending horizontally from the outer side of the arm towards, and including, the portion of the nut provided with the opening 6.

For the purpose of keeping peep-hole 9 free from grit, and to enable it to hold lubricant if so desired, a cover-plate 10 is held in place by bolts 11 and 12; the plate being conveniently provided with a latch-like portion 13 to engage the shank of the bolt 12. This cover-plate also serves as a convenient means for prominently displaying an appropriate legend warning the user that the nut must be periodically inspected.

It will be gathered from the foregoing that this conception is advantageously applicable either to a stationary or to a rotatable nut; in the latter case it being merely necessary to stop the rotation when the sectoral opening comes in registry with the vision of the user, either through the peep-hole 9 or otherwise, according to the manner in which the invention is installed.

It will, likewise, be understood that, instead of forming the intermediate portion of the nut so as to present to view a section of its thread, either one or the other of the ends of the nut may be partially cut away for the same purpose. For example, the nut may be so formed that its lower end-portion 13 will be diametrically cut away and this nut may be so arranged in the socket that said formation will project slightly below the under-face of the arm, as represented by Fig. 4; the peep-hole being unnecessary in this embodiment. So also, it will be apparent, from the fundamental idea of the herein-disclosed conception, that the visual cross-sectional portion may be presented by a member which is non-integral with the nut but which is, however, so mounted and arranged that it will be at all times maintained in rigid relation with the nut; whether the latter be of the stationary or the rotatable type. The purpose of maintaining this rigid relation is to prevent any relative movement between the wear-exhibiting part and the nut proper so that whatever wear of the threads of the nut occurs, will likewise of necessity, similarly exist in the threads of the supplementary portion.

It will, from the foregoing, be seen that, through the adoption of an expedient of the simplest and most elementary nature, a machine-tool may be rendered quite safe in so far as the stripping of threads under wear is concerned and that, without materially increasing the expense of the machine or rending it anywise more complicated, such accidents as have been attributed to undue wear may be altogether obviated.

Without further analysis, the foregoing will so fully reveal the gist of this invention that others can, by applying current knowledge, readily adapt it for various utilizations by retaining one or more of the essential characteristics of either the generic or specific aspects of this invention, and, therefore, such adaptations should be, and are intended to be, comprehended within the meaning and range of equivalency of the following claims:—

Having thus revealed this invention, I claim as new and desire to secure the following combinations and elements, or equivalents thereof, by Letters Patent of the United States:

1. In a machine-tool a movable member in combination with a nut and screw arranged to move said member; said nut being formed to render visible a section of its internal thread, whereby the wear on said thread may be made apparent before the thread becomes unduly weakened.

2. An elevating instrumentality comprising a member adapted to be elevated; a screw; and a nut cooperating therewith to elevate said member, a sector of said nut being absent to enable the condition of its threads to be observed.

3. A safety construction for elevating mechanism consisting of a member adapted to be moved against opposition; a nut secured to said member and formed to present to view a transverse section of a portion of its threaded bore; and a screw adapted to cooperate with said nut to shift said member.

4. A drilling-machine combining an arm; a lifting-screw, therefor; a nut; and means mounted on said arm in rigid relation with said nut, said means presenting to view a radial section in threaded relation with said screw.

In witness whereof, I hereunto subscribe my name.

DAVID C. KLAUSMEYER.